US012709584B2

(12) United States Patent
Pluchon et al.

(10) Patent No.: US 12,709,584 B2

(45) Date of Patent: Aug. 18, 2026

(54) FERTILISING AND/OR SOIL CONDITIONING COMPOSITION INTENDED FOR CULTURE SUBSTRATES AND/OR CULTURE SOLUTIONS

(71) Applicant: AGRO INNOVATION INTERNATIONAL, Saint-Malo (FR)

(72) Inventors: Sylvain Pluchon, Saint-Malo (FR); Mustapha Y O Arkoun, Saint-Jouan des Guerets (FR); Anne Maillard, Saint-Suliac (FR); Jean-Claude Yvin, Saint-Malo (FR); Jose Maria Garcia-Mina Freire, Pamplona (ES)

(73) Assignee: AGRO INNOVATION INTERNATIONAL, Saint-Malo (FR)

( * ) Notice: Subject to any disclaimer, the term of this patent is extended or adjusted under 35 U.S.C. 154(b) by 663 days.

(21) Appl. No.: 18/254,263

(22) PCT Filed: Nov. 22, 2021

(86) PCT No.: PCT/FR2021/052053

§ 371 (c)(1),
(2) Date: May 24, 2023

(87) PCT Pub. No.: WO2022/112695

PCT Pub. Date: Jun. 2, 2022

(65) Prior Publication Data

US 2024/0018062 A1 Jan. 18, 2024

(30) Foreign Application Priority Data

Nov. 25, 2020 (FR) ...................................... 2012113

(51) Int. Cl.
*C05D 3/00* (2006.01)
*C05F 5/00* (2006.01)

(52) U.S. Cl.
CPC . *C05D 3/00* (2013.01); *C05F 5/00* (2013.01)

(58) Field of Classification Search
CPC .................................. C05D 3/00; C05F 5/00
See application file for complete search history.

(56) References Cited

FOREIGN PATENT DOCUMENTS

| | | | |
|---|---|---|---|
| BE | 537524 | A | 5/1959 |
| CN | 105503445 | A | 4/2016 |

(Continued)

OTHER PUBLICATIONS

Patrick S. Michael, "Organic Carbon and Nitrogen Amendment Prevents Oxidation of Subsurface of Sulfidic Soil under Aerobic Conditions", Eurasian Soil Science, 2020, vol. 53, No. 12, pp. 1743-1751.

(Continued)

*Primary Examiner* — Wayne A Langel
(74) *Attorney, Agent, or Firm* — MH2 Technology Law Group LLP

(57) ABSTRACT

The present invention relates to a composition intended for culture substrates and/or culture solutions comprising the combination of—(a) at least one clay, siliceous or clay-siliceous mineral compound and—(b) at least one carbon compound comprising at least 5% by mass of total carbon and/or at least 1% by mass of organic carbon relative to the total mass of the carbon compound, said combination being obtainable by heat treating, in the presence of water, the mixture of compounds (a) and (b). It also relates to the method of manufacturing and using same as well as a fertilizer or soil conditioner comprising same and the use thereof.

20 Claims, 4 Drawing Sheets

(56) References Cited

FOREIGN PATENT DOCUMENTS

| | | | | | |
|---|---|---|---|---|---|
| CN | 105565987 A | * | 5/2016 | .............. | C05C 1/00 |
| CN | 107216227 A | * | 9/2017 | .............. | C05D 3/02 |
| CN | 107226767 A | * | 10/2017 | .............. | C05D 1/00 |
| CN | 107318622 A | | 11/2017 | | |
| CN | 107324873 A | * | 11/2017 | .............. | C05B 7/00 |
| CN | 107787803 A | | 3/2018 | | |
| KR | 20030017800 A | | 3/2003 | | |
| KR | 20030020233 A | | 3/2003 | | |
| KR | 101512934 B1 | | 4/2015 | | |

OTHER PUBLICATIONS

Fontao M. Rodriguez (Authorized Officer), International Search Report dated Mar. 18, 2022 for corresponding International Application No. PCT/FR2021/052053, 9 pages with English translation.

French Search Report dated Jul. 23, 2021 for corresponding French Application No. 2012113, 3 pages.

* cited by examiner

[Fig. 1]
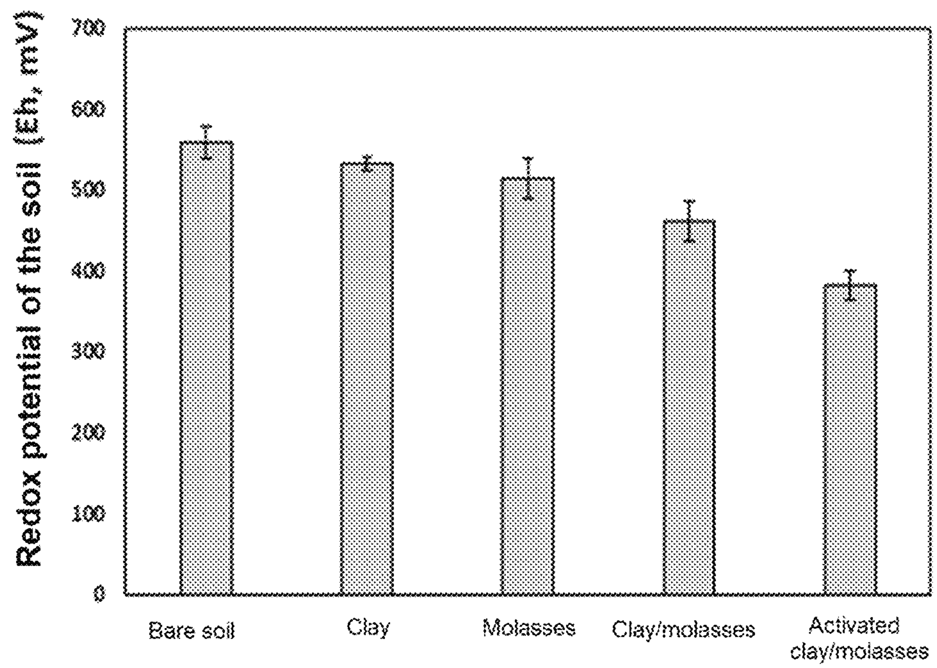
[Fig. 2]
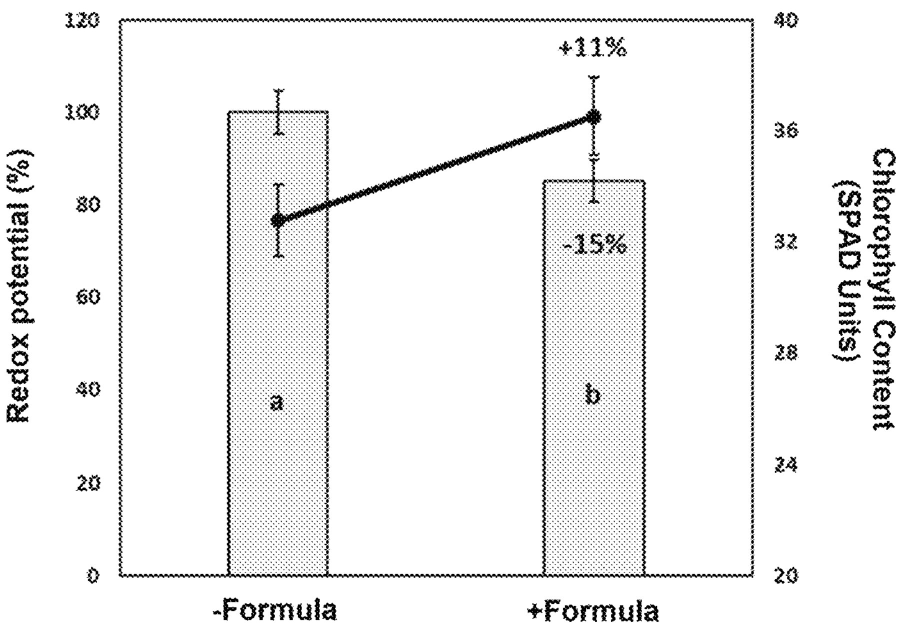

[Fig. 3]
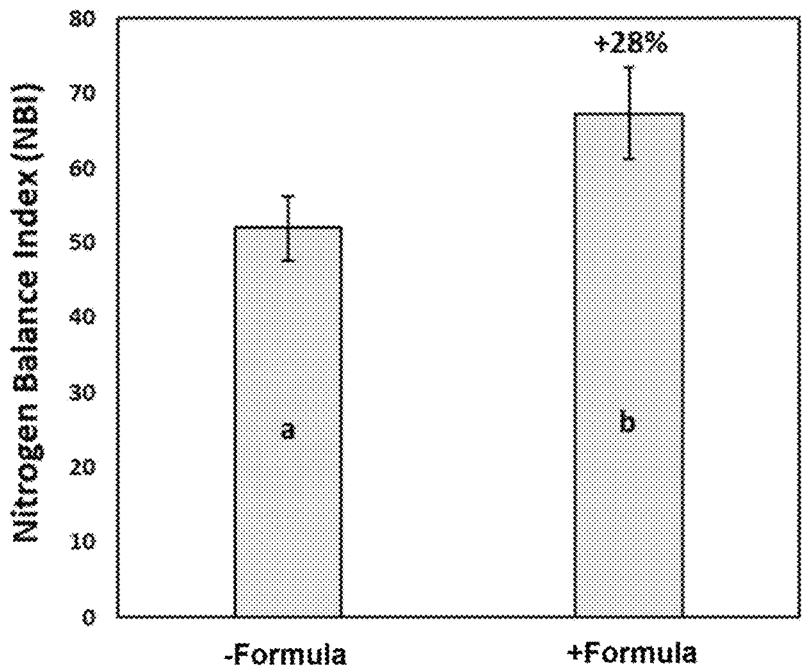

[Fig. 4]
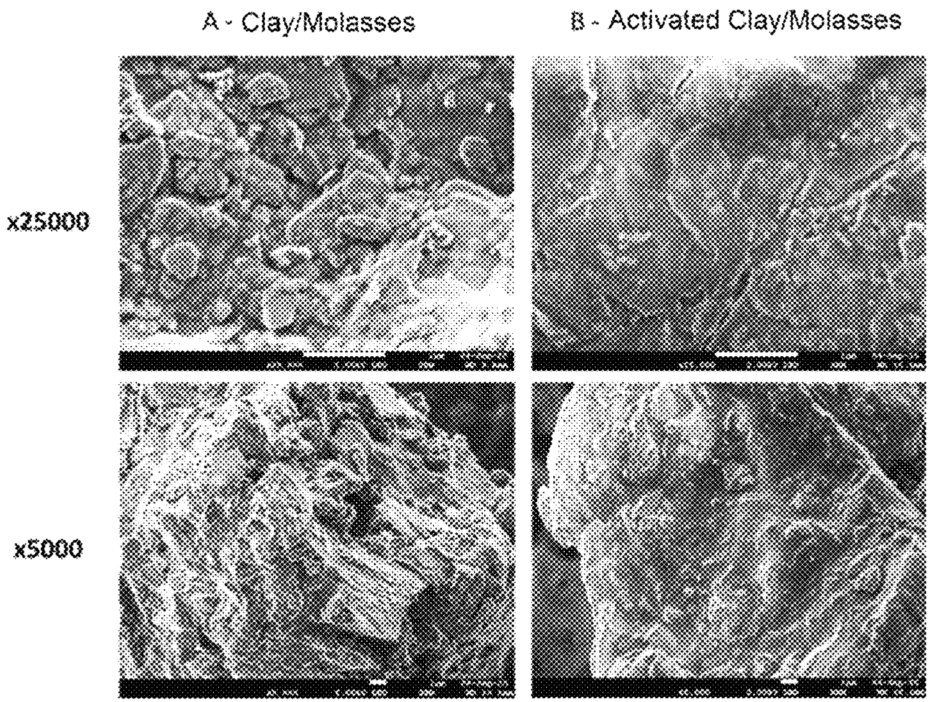
[Fig. 5]
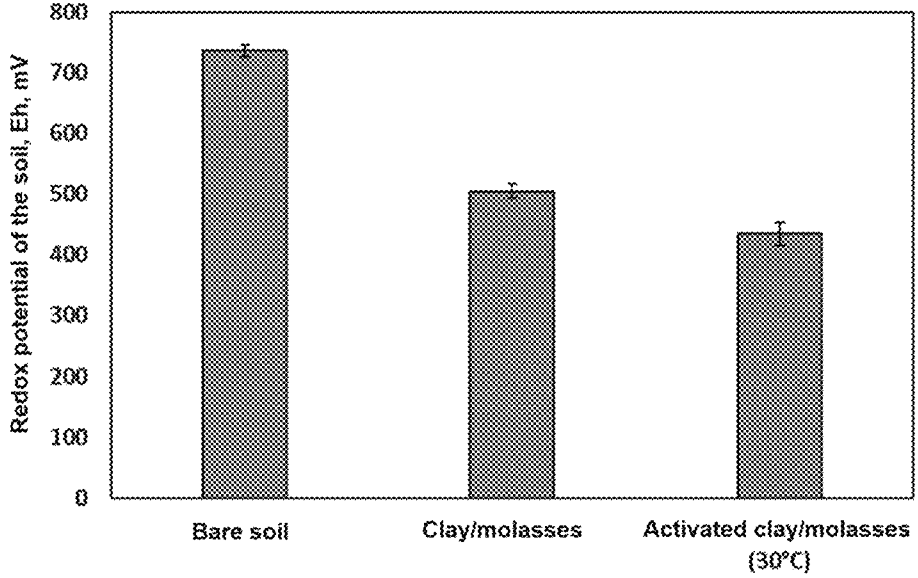

[Fig. 6]
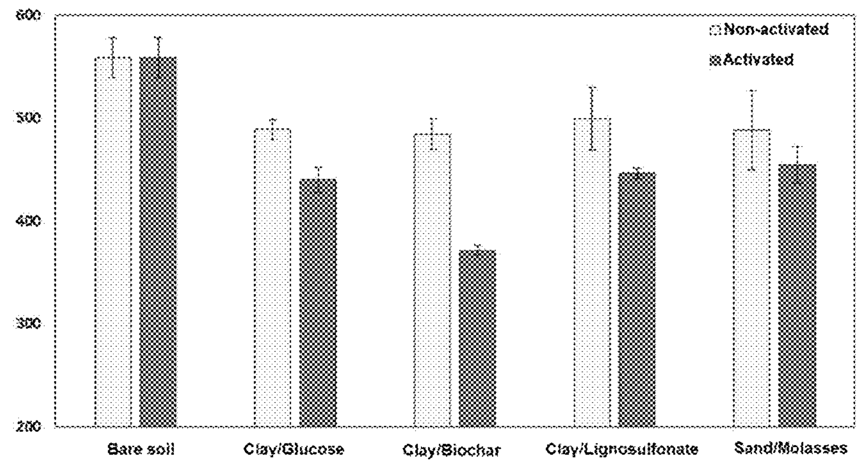

FERTILISING AND/OR SOIL CONDITIONING COMPOSITION INTENDED FOR CULTURE SUBSTRATES AND/OR CULTURE SOLUTIONS

CROSS-REFERENCE TO RELATED APPLICATIONS

This application is a national stage application of PCT/FR2021/052053 filed 22 Nov. 2021, which claims priority to French Patent Application No. 2012113 filed 25 Nov. 2020, the entire disclosures of each application are herein incorporated by reference.

TECHNICAL FIELD

The present invention relates to compositions, in particular fertilizing and/or soil conditioning compositions, intended for culture substrates and/or culture solutions and having an effect on the redox potential (also called oxidation-reduction potential and noted Eh and expressed in mV) of said culture substrate and/or of said culture solution.

PRIOR ART

Many factors are involved in making the nutrients present in the soil available to crops. The pH characterizes the activity of the protons. It is considered in agronomy as a key parameter. Conversely, the oxidation-reduction potential Eh, which concerns the activity of electrons, is only rarely studied. However, electrons are at the heart of a large number of reactions. Thus, recent studies in plant physiology show that redox signals are the basis of all methods regulating the metabolism and development of plants. Physiologically, all living beings develop at a specific pH-Eh level, which they must imperatively maintain at the cells and in particular at the mitochondria and chloroplast. To maintain this pH-Eh balance in the cells, plants will resort to chemical buffers in the short term, to the activation of genes for the formation of proteins in the medium term and they will “evacuate” the very oxidized/acidic products in the walls to preserve the cells. But they will also seek to control the external environment, at the rhizosphere, by exuding compounds which will modify the pH and Eh and activate/feed the microflora which also contributes to correcting this external environment. Thus the roots of plants will always seek to maintain an environment close to acid/base and electrical neutrality (slightly acidic and reduced). Optimal values of the redox potential for plant growth are comprised between 350 and 450 mV. When the Eh falls below 350 mV, growth is greatly reduced, in particular due to a drop in photosynthesis and enzymatic activities. At the microbial scale, microorganisms also intervene in the regulation of Eh and pH, by modifying the Eh and pH of their environment, according to their needs. Thus, they contribute indirectly, through their selection, to improving the Eh/pH conditions of the environment in which the plant is located. And conversely, each type of microorganism is adapted to specific more or less broad Eh/pH conditions. They can only grow in certain ranges of Eh/pH values. The oxidation-reduction potential of the soil thus not only has a direct impact on plant growth, but also an indirect impact through the selection of microorganisms present in the soil.

Numerous compositions exist which allow to regulate the pH of soils and therefore of culture substrates and/or culture solutions. However, there is little composition that allows to act on the redox potential. However, the inventors surprisingly realized that a particular composition had an impact on the redox potential and allowed to achieve the optimal redox potential of the soils.

DISCLOSURE OF THE INVENTION

The present invention therefore relates to a composition intended for culture substrates and/or culture solutions comprising the combination of:

(a) at least one clay, siliceous or clay-siliceous mineral compound and (b) at least one carbon compound comprising at least 5% by mass of total carbon and/or at least 1% by mass of organic carbon relative to the total mass of the carbon compound, said combination being obtainable by heat treating, in the presence of water, the mixture of compounds (a) and (b), the heat treatment consisting of heating to a temperature comprised between 30° C. and 95° C. and the water content of the combination being comprised between 1 and 5% by mass relative to the total mass of the combination.

Within the meaning of the present invention, the term “culture substrate” means any soil or medium on which a culture can develop such as for example artificial soil, cultivated agricultural soil, uncultivated agricultural soil, peat, compost, rock wool or coconut fiber.

Within the meaning of the present invention, the term “culture solution” means any solution which allows the cultivation of a plant such as for example irrigation water, liquid solution intended for fertigation by sprinkling or drop by drop, hydroponic bath or aeroponic solution.

The composition according to the invention therefore comprises the combination of the compounds (a) at least one clay, siliceous or clay-siliceous mineral compound and (b) at least one carbon compound comprising at least 5% by mass of total carbon and/or at least 1% by mass of organic carbon relative to the total mass of the carbon compound, in particular at least 5% by mass of total carbon and at least 1% by mass of organic carbon relative to the total mass of the carbon compound, advantageously at least 10% by mass of total carbon and/or at least 5% by mass of organic carbon relative to the total mass of the carbon compound, more advantageously at least 15% by mass of total carbon and/or at least 10% by mass of organic carbon relative to the total mass of the carbon compound.

For the purposes of the present invention, the term “clay, siliceous or clay-siliceous mineral compound” means any mineral compound rich in or based on silica which is in the form of silicate, in particular aluminosilicate (clay mineral compound) or silicon oxide ($SiO_2$) (siliceous compound) or a mixture of silicate and silicon oxide (clay-siliceous compound). It can be a mineral, a rock such as clay, in particular kaolin, sand such as silica sand, sediment such as tangue, or a sedimentary rock such as diatomite. Advantageously, this compound may contain iron, in particular in the form of iron oxide such as $Fe_2O_3$. In particular, the compound (a) according to the invention comprises at least 25% by weight, advantageously at least 40% by weight, even more advantageously at least 50% by weight, of silica in the form of silicon oxide, of clay or of clay-silicon oxide mixture. Thus, in a particularly advantageous manner, the compound (a) according to the invention is a clay or clay-siliceous mineral compound, more particularly clay compound. Advantageously, the compound (a) according to the invention is selected from the group consisting of clay such as kaolin, smectite, montmorillonite, nontronite or bentonite, diatomaceous earth, tangue, siliceous sand and mixtures thereof, more advantageously it is clay or siliceous sand, even more advantageously clay. The clay may in particular be a phyllosilicate, more particularly selected from bentonites, kaolin and mixtures thereof, even more particularly from smectites, illites, kaolinites and mixtures thereof. It may, for example, be bentonite sold by the company Lafaure under the name Argile du Périgord (Cas n°: 215-108-5 and INCI name: bentonite) and containing 75% of smectites, 15% of illites and 10% of kaolinites, by weight relative to the total weight of the clay, and in particular containing a content by weight of $Fe_2O_3$=5.76%, $SiO_2$=56.76% and $Al_2O_3$=16.77%, relative to the total weight of the clay.

Within the meaning of the present invention, "organic carbon or $C_{org}$" means any carbon produced by living organisms. Organic carbon is therefore bound to other carbons or to elements like hydrogen (H), oxygen (O), nitrogen (N) or phosphorus (P) in organic molecules. It can be measured according to standard NF EN ISO 10694 dated 1995 by dry combustion. The total carbon content can also be measured according to standard NF EN ISO 10694 dated 1995 by dry combustion. Advantageously, the carbon compound (b) according to the invention comprises at least one redox function, in particular selected from a carboxyl group, a carbonyl group, a hydroxyl group, an ether group, an ester group, a peroxyl group, an amine group, an amide group, a thiocarboxyl group, a thiocarbonyl group, a thioester group, a thioether group, a sulfonyl group and a phosphoryl group. Advantageously, the compound (b) according to the invention is selected from the group consisting of saccharides such as glucose and molasses, chars, biochars, hydrochars, carbon blacks, lignosulfonates, vinasse, proteins, amino acids, whey, fermented plant or seaweed extracts and mixtures thereof, advantageously from the group consisting of saccharides such as glucose and molasses, biochars, lignosulfonates and mixtures thereof, more advantageously from the group consisting of saccharides such as glucose and molasses, biochars and mixtures thereof, even more advantageously it is molasses, alone or mixed with a biochar, in particular molasses having a Brix degree comprised between 75 and 80 and/or a % by weight of total sugars (expressed as sucrose) comprised between 45 and 55% and/or a viscosity at 20° C. comprised between 2000 and 6000 mPa·s and/or comprising 23% sucrose and 24% glucose, more particularly sugar cane molasses, even more particularly marketed by the company France Mélasse under the name BIOMELNA.

Particularly advantageously, the compound (b) according to the invention does not contain fulvic acid and/or humic acids.

Advantageously, the compound (a)/compound (b) mass ratio of the combination according to the invention is comprised in the range 70/30-5/95, advantageously 60/40-10/90, more advantageously 57/43-10/90. The combination of compounds (a) and (b) according to the invention is therefore obtainable by heat treating, in the presence of water, the mixture of compounds (a) and (b), this heat treatment consisting of heating at a temperature comprised between 30° C. and 95° C., in particular between 60° C. and 90° C., more particularly between 65° C. and 75° C., even more particularly at a temperature of 70° C., advantageously for a duration comprised between 1 minute and 48 hours, in particular between 3 minutes and 24 hours. In particular, this heat treatment can be preceded by grinding the mixture of compounds (a) and (b), more particularly when at least one of the compounds (a) and (b) is in undivided solid form, that is to say is not in powder form. The grinding can be implemented by screw or ball milling. Water can be added at any time, before or during the heat treatment. Advantageously it is added before the heat treatment and even more advantageously before any grinding. This addition can therefore be carried out by humidification, and the amount of water added is advantageously comprised between 0.1 and 10 ml of water per gram of the mixture of compounds (a) and (b). This method allowing to obtain the combination according to the invention may also be referred to in the present application as the "activation method" or "activation".

The heat treatment according to the invention is therefore not a microwave treatment. Advantageously, it is not a fermentation.

Advantageously, the mixture does not undergo calcination, in particular at a temperature above 100° C.

The combination obtained can also be called in the present application "activated mixture" or "activated product".

The water content of the combination is comprised between 1 and 5% by mass relative to the total mass of the combination. The combination is therefore not freeze-dried.

The composition according to the invention may further comprise other ingredients apart from the combination according to the invention. Thus the composition may comprise natural or synthetic biostimulant compounds such as amino acids, growth regulators, carboxylic acids, seaweed extracts, humic substances, plant extracts, microbial extracts, mineral materials such as nitrogen, phosphorus, potassium, molybdenum, calcium, sulfur, magnesium, iron, chlorine, manganese, zinc, boron, boric acid, disodium octaborate tetrahydrate, calcium borate, magnesium borate, sodium borosilicate, sodium tetraborate decahydrate, sodium borate, sodium tetraborate, disodium tetraborate, lime, gypsum, superphosphate, iron sulfate, iron chelate, ferritin, zinc oxide, zinc sulfate, zinc chelate, potassium nitrate, calcium nitrate, magnesium nitrate, ammonium phosphate, ammonium sulfate, magnesium sulfate, monopotassium phosphate, calcium carbonate, ammonium sulfate nitrate, ammonium thiosulfate, ammonia solution, calcium cyanamide, crotonylidene diurea, diacyandiamide, isobutylidene diurea, sodium nitrate, potassium carbonate, potassium chloride, potassium and magnesium sulfate, potassium metaphosphate, potassium sulfate, calcium chloride, calcium oxide, calcitic limestone, dolomitic limestone, magnesium and ammonium phosphate, magnesium oxide, copper chelates, cupric ammonium phosphate, copper sulfate, copper frits, copper polyflavonoid, malachite, azurite, cuprous oxide, cupric oxide, cupric acetate, boron frits, ferric sulfate, ferrous sulfate, ferrous ammonium sulfate, ferrous ammonium phosphate, ferrous oxalate, ferrous carbonate, iron lignosulfonate, iron polyflavonoid, iron frits, iron methoxyphenylpropane, ferrous oxide, ferric oxide, iron and ammonium polyphosphate, manganese oxide, manganese methoxyphenyl propane, manganese frits, manganese chloride, manganese carbonate, manganese sulfate, manganese chelate, manganese and ammonium phosphate, manganese polyflavonoid, ammonium molybdate, sodium molybdate, molybdenum frits, molybdenum trioxide, molybdenum disulfide, zinc frits, zinc carbonate, zinc phosphate, zinc and ammonium phosphate, zinc sulfide, zinc lignosulfonate, zinc polyflavonoid or a combination thereof and/or any excipient suitable for administration to a culture substrate and/or to a culture solution.

The composition according to the invention may further comprise any excipient suitable for administration to a culture substrate and/or to a culture solution.

The composition according to the invention may be in solid form, in particular in the form of powder, granules or microgranules, in the form of a liquid suspension or in the form of a gel or in a water-soluble form. In particular, the composition is not freeze-dried or dehydrated.

The present invention further relates to the use of the composition according to the invention, for

- reducing the redox potential of an oxidized culture substrate and/or of an oxidized culture solution, in particular of a culture substrate whose redox potential is greater than 450 mV and/or of a culture solution whose redox potential is greater than 450 mV, more specifically reducing the redox potential to a value comprised between 450 mV and 350 mV, or
- increasing the redox potential of a reduced culture substrate and/or of a reduced culture solution, in particular of a culture substrate whose redox potential is less than 350 mV and/or of a culture solution whose redox potential is less than 350 mV, more particularly increasing the redox potential to a value comprised between 450 mV and 350 mV, and/or
- maintaining the redox potential of a culture substrate and/or a culture solution at a value comprised between 450 mV and 350 mV.

The composition can thus have a different effect depending on the redox potential of the culture substrate and/or of the culture solution. It may therefore be a reduction of this redox potential, if the culture substrate is oxidized and/or the culture solution is oxidized, in particular if the culture substrate has a redox potential greater than 450 mV and/or the culture solution has a redox potential greater than 450 mV, advantageously a reduction in the redox potential to a value comprised between 450 mV and 350 mV. It can also be an increase in this redox potential, if the culture substrate is reduced and/or the culture solution is reduced, in particular if the culture substrate has a redox potential less than 350 mV and/or the culture solution has a redox potential less than 350 mV, advantageously an increase in the redox potential to a value comprised between 450 mV and 350 mV. It may also involve maintaining this redox potential at a value comprised between 450 mV and 350 mV when this potential is already comprised in this range. Finally, it may be both a reduction in this redox potential followed by maintenance at a value comprised between 450 mV and 350 mV, if the culture substrate is oxidized and/or the culture solution is oxidized, in particular if the culture substrate has a redox potential greater than 450 mV and/or the culture solution has a redox potential greater than 450 mV, or an increase in this redox potential if the culture substrate is reduced and/or the culture solution is reduced, in particular if the culture substrate has a redox potential less than 350 mV and/or the culture solution has a redox potential less than 350 mV, followed by maintenance at a value comprised between 450 mV and 350 mV.

Advantageously, the use of the composition according to the invention is to reduce the redox potential of an oxidized culture substrate and/or of an oxidized culture solution, in particular of a culture substrate whose redox potential is greater than 450 mV and/or of a culture solution whose redox potential is greater than 450 mV, more particularly to reduce the redox potential to a value comprised between 450 mV and 350 mV then optionally maintain the redox potential of said culture substrate and/or of said culture solution at a value comprised between 450 mV and 350 mV.

Advantageously, the use can be implemented by applying the composition according to the invention to the surface or as a mixture with the culture substrates and/or solutions. In particular, in the case of culture solutions it is rather a mixture. In the case of culture substrates, the composition according to the invention can be applied to the surface or mixed with the substrate, for example with the first layers of the substrate. The application can be carried out directly on the culture substrate, over the entire surface of the culture substrate or locally in the region of the roots of the plants to be treated, by any appropriate means of distribution, such as for example by spraying in the case of a liquid suspension.

Advantageously, the composition according to the invention is used by application at a concentration of 1 kilogram to 200 kilograms of the combination per hectare, once or several times. The person skilled in the art will know how to adapt the amounts to be used according to the mode of application chosen. In particular, relatively smaller amounts are used when the composition according to the invention is applied in the root region, whereas relatively larger amounts are used when the composition is applied over the entire surface of the culture substrate. The composition according to the invention can be used in a single application or else in sequential application.

The application can take place before and/or during the growth of the cultivated plants, before and/or after germination of the plants, for example during transplanting in the case of plants requiring transplanting. Advantageously, it takes place after germination.

The present invention further relates to a method for manufacturing the composition according to the present invention by heat treating, in the presence of water, the mixture of compounds (a) and (b), advantageously by the activation method described above. In particular, said method comprises the following successive steps:

- A—mixing the compounds (a) and (b) in the presence of water, advantageously by humidification, in particular in a content of 0.1 ml to 10 ml of water per gram of mixture, optionally followed by grinding the mixture;
- B—heat treating the mixture obtained in step A), advantageously by heating to a temperature comprised between 30° C. and 95° C., in particular between 60° C. and 90° C., more advantageously for a duration comprised between 1 minute and 48 hours, in particular between 3 minutes and 24 hours;
- C—recovering the composition obtained in step B).

Advantageously, the method according to the invention may comprise an additional step B1), between steps B) and C), of additions of additional ingredients, in particular selected from natural or synthetic biostimulant compounds such as amino acids, growth regulators, carboxylic acids, seaweed extracts, humic substances, plant extracts, microbial extracts, minerals such as nitrogen, phosphorus, potassium, molybdenum, calcium, sulfur, magnesium, iron, chlorine, manganese, zinc, boron, boric acid, disodium octaborate tetrahydrate, calcium borate, magnesium borate, sodium borosilicate, sodium tetraborate decahydrate, sodium borate, sodium tetraborate, disodium tetraborate, lime, gypsum, superphosphate, iron sulfate, iron chelate, ferritin, zinc oxide, zinc sulfate, zinc chelate, potassium nitrate, calcium nitrate, magnesium nitrate, ammonium phosphate, ammonium sulfate, magnesium sulfate, monopotassium phosphate, calcium carbonate, ammonium sulfate nitrate, ammonium thiosulfate, ammonia solution, calcium cyanamide, crotonylidene diurea, diacyandiamide, isobutylidene diurea, sodium nitrate, potassium carbonate, potassium chloride, potassium and magnesium sulfate, potassium metaphosphate, potassium sulfate, calcium chloride, calcium oxide, calcitic limestone, dolomitic limestone, magnesium and ammonium phosphate, magnesium oxide, copper chelates, cupric ammonium phosphate, copper sulfate, copper frits, copper polyflavonoid, malachite, azurite, cuprous oxide, cupric oxide, cupric acetate, boron frits, ferric sulfate, ferrous sulfate, ferrous ammonium sulfate, ferrous ammonium phosphate, ferrous oxalate, ferrous carbonate, iron lignosulfonate, iron polyflavonoid, iron frits, iron methoxyphenylpropane, ferrous oxide, ferric oxide, iron and ammonium polyphosphate, manganese oxide, manganese methoxyphenyl propane, manganese frits, manganese chloride, manganese carbonate, manganese sulfate, manganese chelate, manganese and ammonium phosphate, manganese polyflavonoid, ammonium molybdate, sodium molybdate, molybdenum frits, molybdenum trioxide, molybdenum disulfide, zinc frits, zinc carbonate, zinc phosphate, zinc and ammonium phosphate, zinc sulfide, zinc lignosulfonate, zinc polyflavonoid or a combination thereof and/or any excipient suitable for administration to a culture substrate and/or to a culture solution.

The present invention further relates to a fertilizer or soil conditioner comprising the composition according to the invention, the fertilizer advantageously being a simple, binary or ternary solid fertilizer of the mineral fertilizer, organo-mineral fertilizer, organic fertilizer, or a water-soluble fertilizer type and the soil conditioner advantageously being a mineral, organo-mineral or organic soil conditioner.

The present invention finally relates to the use of the fertilizer or the soil conditioner according to the invention to modify the redox potential and the pH of the soils, to stimulate the enzymatic activities of the cycle of carbon, nitrogen, sulfur and phosphorus, improve the bioavailability of macro-(N, P, K, S, Mg and Ca) and micro-(Fe, Mn, Cu, Zn, Mo, Se) nutrients, stimulate bacterial and fungal growth in soils, promote the transformation of nitrous oxide ($N_2O$) into dinitrogen ($N_2$), stimulate the production of chlorophyll in plants and/or increase the nitrogen content of plants.

The present invention will be better understood upon reading the description of the drawings and the examples which follow, which are given by way of non-limiting indication.

BRIEF DESCRIPTION OF THE DRAWINGS

FIG. 1 represents the values of the redox potential (Eh) in a soil according to the conditions of Example 1 for:

bare soil that does not comprise mineral compound (a) or carbon compound (b) (bare soil), a soil which comprises clay (marketed by the Company Lafaure under the name Argile du Périgord (Cas n°: 215-108-5 and INCI name: bentonite) (Clay) (compound (a)), a soil which comprises molasses (marketed by the Company France Mélasse) (molasses) (compound (b)), a soil which comprises the mixture of clay and molasses (clay/molasses) (simple mixture of compounds (a) and (b)) and a soil which comprises the clay-molasses combination according to the invention, (activated clay/molasses).

FIG. 2 represents the percentage of variation in redox potential (Eh variation, %—histograms) of a cultivated soil (initial Eh=528.14) in the presence of a wheat plant, and the chlorophyll content (SPAD units—curve) of wheat plants cultivated under the conditions of Example 2 in:

a soil with a treatment which comprises a redox formula comprising the combination according to the invention (+Redox formula) and a soil with a treatment that does not comprise a redox formula (−redox formula).

FIG. 3 represents the nitrogen content (Nitrogen Balance Index, BNI) of wheat plants cultivated in soil under the conditions of Example 2 in:

a soil with a treatment which comprises a redox formula comprising the combination according to the invention (+Redox formula) and a soil with a treatment that does not comprise a redox formula (−redox formula).

FIG. 4 represents the photographs obtained by observation with a Scanning Electron Microscope (SEM) with a magnification X25000 or X5000 of the surface of the simple mixture of molasses and clay (A—Clay/Molasses) or of the combination according to the invention of molasses and clay (B—activated Clay/Molasses) under the conditions of Example 3.

FIG. 5 represents the values of the redox potential (Eh) in a soil according to the conditions of Example 4 for:

bare soil that does not comprise mineral compound (a) or carbon compound (b) (bare soil), a soil which comprises the mixture of clay (marketed by the Company Lafaure under the name Argile du Périgord (Cas n°: 215-108-5 and INCI name: bentonite) (Clay) (compound (a)) and molasses (marketed by Company France Mélasse) (molasses) (compound (b)) (clay/molasses) (simple mixture of compounds (a) and (b)) and a soil which comprises the clay-molasses combination according to the invention, (activated clay/molasses).

FIG. 6 represents the values of the redox potential (Eh) in a soil according to the conditions of Example 5 for:

a bare soil that does not comprise any mineral compound (a) or carbon compound (b) (bare soil), a soil which comprises the simple mixture of clay (compound (a)) and glucose (compound (b)) (non-activated clay/glucose) (simple mixture of compounds (a) and (b)), a soil which comprises the simple mixture of clay (compound (a)) and biochar (compound (b)) (non-activated Clay/Biochar) (simple mixture of compounds (a) and (b)), a soil which comprises the simple mixture of clay (compound (a)) and Lignosulfonate (compound (b)) (non-activated Clay/Lignosulfonate) (simple mixture of compounds (a) and (b)), a soil which comprises the simple mixture of sand (compound (a)) and molasses (compound (b)) (non-activated Sand/Molasses) (simple mixture of compounds (a) and (b))

a soil which comprises the clay/glucose combination according to the invention, (activated Clay/Glucose)

a soil which comprises the combination clay/biochar according to the invention, (activated Clay/Biochar)

a soil which comprises the combination clay/lignosulfonate combination according to the invention, (activated Clay/Lignosulfonate)

a soil which comprises the combination sand/molasses according to the invention, (activated Sand/Molasses).

EXAMPLE 1: MEASUREMENT OF THE REDOX POTENTIAL OF THE SOIL IN THE PRESENCE OF THE COMBINATION ACCORDING TO THE INVENTION AND COMPARISON WITH SOILS NOT COMPRISING THE COMBINATION

The combination according to the invention (activated Clay/Molasses) comprises:

clay (bentonite marketed by the company Lafaure under the name Argile du Périgord (Cas n°: 215-108-5 and INCI name: bentonite) and containing 75% smectites, 15% illites and 10% kaolinites, by weight relative to the total weight of the clay, and in particular containing a content by weight of $Fe_2O_3$=5.76%, $SiO_2$=56.76% and $Al_2O_3$=16.77%, based on the total weight of the clay) as compound (a) and molasses (marketed by the company France Mélasse under the name BIOMELNA having a Brix degree comprised between 75 and 80, a % by weight of total sugars (expressed as sucrose) comprised between 45 and 55% and/or a viscosity at 20° C. comprised between 2000 and 6000 mPa·s) as compound (b)

in a compound (a)/compound (b) mass ratio of 57%/43%.

The combination is obtained by moistening the mixture of (a) and (b) by incorporating water into the mixture to reach a humidity of 10%, grinding the mixture using a Reax 2 Heidolph Shaker and drying at a temperature of 70° C. for 24 hours to reach a residual humidity of 1 to 3%.

The effect of this combination according to the invention (activated Clay/molasses) on the redox potential of the soil is compared with the effect of the simple mixture of compounds (a) and (b) (Clay/molasses) and with the effect of each of the compounds taken separately (Molasses) and (Clay) and not treated by an activation method as well as the redox potential of the bare soil which does not comprise any mineral compound (a) or carbon compound (b).

The simple comparative mixture of compounds (a) and (b) (without activation method) is implemented without water and without heating (at room temperature) with the same mass ratio (57%/43%).

The soil on which the various treatments are implemented (no addition of compound, addition of compound (a) alone, addition of compound (b) alone, addition of compounds (a) and (b) in simple mixture or in combination according to the invention) has the characteristics shown in Table 1 below.

TABLE 1

| Texture | Loam |
|---|---|
| pH | 5.23 |
| Organic material (%) | 2.4 |
| Cation exchange capacity (in meq/Kg) | 93 |

The protocol of the example is as follows:

10 g of dry soil, sieved with a sieve whose mesh diameter is 2 mm, are placed in 60 ml plastic pillboxes. 1 g of this treatment (compound (a) alone, compound (b) alone, compounds (a) and (b) in simple mixture or in combination according to the invention) is added or no treatment is added (bare soil).

After manual stirring for 30 seconds, 4 ml of water are added, this volume allowing to reach 80% of the field capacity of the soil studied. The pillboxes are then hermetically sealed, then incubated at a temperature of 20° C. for 2 hours. The measurement of the redox potential of the soil is then carried out.

This measurement is carried out using a combined “Inlab Redox” electrode connected to a “Mettler S210 pH Meter” box. The soils are brought back to 100% of their capacity in the field with the addition of 1 ml of water. Each soil sample is then stirred manually for 10 s, then the combined electrode is inserted vertically into the soil to read the redox potential (Eh, mV). The entire device is placed in a Faraday cage for optimal reading of the redox potential.

For each of the incubation conditions, three batches of soil were made up (1 batch=1 biological replicate). All the treatments were carried out systematically for each of the biological replicates, that is to say in triplicate.

The data obtained were presented as the mean and the variability of the results was given as the standard error of the mean for n=3.

The measurement of the redox potential of soils is shown in FIG. 1.

Conclusion: FIG. 1 shows a greater decrease in the redox potential of the soil when the soils are treated with the combination according to the invention.

EXAMPLE 2: MEASUREMENT OF THE REDOX POTENTIAL OF A SOIL CULTIVATED IN THE PRESENCE OF WHEAT AND OF THE CHLOROPHYLL AND NITROGEN CONTENT OF WHEAT PLANTS HAVING RECEIVED, OR NOT, A REDOX FORMULA

The redox formula contains 5 g of a soil conditioning formulation (35%-CaO, 5%-MgO) to which is added 1 g of the combination of clay and molasses according to the invention at a mass ratio of 57%/43% as described in Example 1.

Preparation of Plant Material

Wheat seeds, *Triticum aestivum* L. Var RUBISKO, were placed at +4° C. the day before germination to ensure uniform emergence. They were then sown on a layer of vermiculite in trays containing demineralised water and were left in the dark for 7 days. After germination, the seedlings were transplanted into 2 L pots containing a culture substrate composed of a soil-vermiculite mixture (50/50-V/V), corresponding to 1300 g of dry soil and 150 g of vermiculite.

Preparation of the Soil-Vermiculite Growing Medium 1300 g of dry soil, the characteristics of which are indicated in Table 1 of Example 1, sifted with a sieve whose mesh diameter is 2 mm, mixed with 150 g of vermiculite are placed in 2 L plastic pots to which the different treatments are added (with or without redox formula, respectively +Formula and −Formula).

Protocol for Implementing the Test:

After germination, 3 wheat plants were transplanted per pot. The redox formula is added and mixed manually with the substrate just before transplanting (+formula) or no redox formula is added (−formula). The pots are watered 3 times a week to maintain their field capacity at 80%. The plants are cultivated for 20 days in a greenhouse at a daytime temperature of 20° C., nighttime temperature of 14° C. and a photoperiod of 14H/10H (day/night). The measurement of the redox potential of the soil, the chlorophyll content and the nitrogen content of the wheat leaves are then carried out.

Measurement of the redox potential of the soil: This is carried out using a combined “Inlab Redox” electrode connected to a “Mettler S210 pH Meter” box. The soils are reduced to 80% of their capacity in the field. The combined electrode is inserted vertically into the ground for reading the redox potential (Eh, mV). The entire device is placed in a Faraday cage for optimal reading of the redox potential.

Measurement of the chlorophyll content of wheat leaves: This is carried out using a DUALEX®.

Measurement of the nitrogen content of wheat leaves: This is carried out using a DUALEX®.

For each of the conditions, five batches of plants cultivated on soil-vermiculite soil substrate were formed (1 batch=1 biological replicate). All the treatments were carried out systematically for each of the biological replicates. The data obtained were presented as the mean and the variability of the results was given as the standard error of the mean for n=5.

The measurement of the redox potential of cultivated soils and the chlorophyll content of wheat plants is shown in FIG. 2 and the nitrogen content (the Nitrogen Balance Index, NBI) of wheat plants is shown in FIG. 3.

Conclusion: The graph (FIG. 2) shows a 15% decrease in the redox potential of the soil cultivated in the presence of wheat whose treatment comprises a redox formula compared to the soil whose treatment does not comprise a redox formula; and an 11% increase in chlorophyll contents of wheat plants cultivated in soil treated with a redox formula compared to soil the treatment of which does not comprise a redox formula. The graph in FIG. 3 shows a 28% increase in nitrogen contents (Nitrogen Balance Index, NBI) of wheat plants cultivated in soil treated with a redox formula compared to soil the treatment of which does not comprise a redox formula.

EXAMPLE 3: OBSERVATION BY SCANNING ELECTRON MICROSCOPY (SEM) OF THE SURFACE CHARACTERISTICS OF THE MIXTURES OF COMPOUNDS (A) AND (B) (SIMPLE MIXTURE OR COMBINATION ACCORDING TO THE INVENTION)

The combination of clay and molasses according to the invention (B—activated Clay/Molasses) and the simple mixture (A—Clay/molasses) at a mass ratio of 57%/43% are as described in Example 1.

Preparation of Samples and Observation in Scanning Electron Microscopy (SEM):

A few milligrams of the combination according to the invention or of the simple mixture are deposited on a conductive carbon tape.

The observations are then carried out using a Scanning Electron Microscope (SEM), having the following characteristics: JEOL brand, JSM-7900F type; acceleration voltage: 2 Kv; working distance: 10 mm; the detector is of the Everhart-Thornley type for the secondary electrons. Images are taken with ×5000 and ×25000 magnification.

FIG. 4 shows differences in surface characteristics between simple clay/molasses mixtures (photos on the left, top ×25000, bottom ×5000) and the combination according to the invention clay/molasses (photos on the right, top ×25000, bottom ×5000).

EXAMPLE 4: MEASUREMENT OF THE REDOX POTENTIAL OF THE SOIL IN THE PRESENCE OF THE COMBINATION ACCORDING TO THE INVENTION AND COMPARISON WITH SOILS NOT COMPRISING THE COMBINATION

The combination according to the invention is prepared under the same conditions as those of Example 1 with the exception of the temperature of the heat treatment which is 30° C. and not 70° C.

The effect of this combination according to the invention (activated Clay/molasses) on the redox potential of the soil is compared with the effect of the simple mixture of compounds (a) and (b) (Clay/molasses) not treated by an activation method as well as the redox potential of the bare soil which does not comprise mineral compound (a) or carbon compound (b) under the same conditions as those of Example 1, the bare soil and the simple mixture being the same as in Example 1. The measurement of the redox potential of the soils is shown in FIG. 5.

Conclusion: FIG. 5 shows a greater decrease in the redox potential of the soil when the soils are treated with the combination according to the invention.

EXAMPLE 5: MEASUREMENT OF THE REDOX POTENTIAL OF THE SOIL IN THE PRESENCE OF DIFFERENT TYPES OF COMBINATION ACCORDING TO THE INVENTION AND COMPARISON WITH SOILS NOT COMPRISING THE COMBINATION

Types of combination according to the invention:

The Clay (a)/Glucose (b) combination; mass ratio (57%/43%).

The Clay (a)/Biochar (b) combination; mass ratio (57%/43%).

The Clay (a)/Lignosulfonates (b) combination; mass ratio (57%/43%).

The Sand (a)/Molasses (b) combination; mass ratio (57%/43%).

The clay and molasses are as described in Example 1.

The glucose is D-(+)-Glucose marketed by Sigma Aldrich.

The biochar has a fixed carbon content >50% and a pH between 6 and 10 and is marketed by IMCD.

Lignosulfonates have a DM (dry matter) rate of 93% and a pH of 8 (+/−1) and are marketed by Borregaard Lignotech.

The sand is silica sand.

The combination is obtained by moistening the mixture of (a) and (b) by incorporating water into the mixture to reach a humidity of 10%, grinding the mixture using a Reax 2 Heidolph Shaker and drying at a temperature of 70° C. for 24 hours to reach a residual humidity of 1 to 3%.

The effect of these combinations according to the invention on the redox potential of the soil is compared with the effect of the simple mixture of the compounds (a) and (b) as well as with the redox potential of the bare soil which does not comprise any mineral compound (a) or carbon compound (b).

The simple comparative mixture of compounds (a) and (b) (without activation method) is implemented without water and without heating (at room temperature) with the same mass ratio (57%/43%).

The soil on which the various treatments are implemented (no addition of compound, addition of compounds (a) and (b) in simple mixture or in combination according to the invention) has the characteristics indicated in Table 1 of Example 1.

The protocol of the example is as follows:

10 g of dry soil, sieved with a sieve with a mesh diameter of 2 mm, are placed in 60 ml plastic pillboxes. 1 g of this treatment (compounds (a) and (b) in simple mixture or in combination according to the invention) is added or no treatment is added (bare soil).

After manual stirring for 30 seconds, 4 ml of water are added, this volume allowing to reach 80% of the field capacity of the soil studied. The pillboxes are then hermetically sealed, then incubated at a temperature of 20° C. for 2 hours. The measurement of the redox potential of the soil is then carried out.

This measurement is carried out using a combined "Inlab Redox" electrode connected to a "Mettler S210 pH Meter" box. The soils are brought back to 100% of their capacity in the field with the addition of 1 ml of water. Each soil sample is then stirred manually for 10 s, then the combined electrode is inserted vertically into the soil to read the redox potential (Eh, mV). The entire device is placed in a Faraday cage for optimal reading of the redox potential.

For each of the incubation conditions, three batches of soil were made up (1 batch=1 biological replicate). All the treatments were carried out systematically for each of the biological replicates, that is to say in triplicate.

The data obtained were presented as the mean and the variability of the results was given as the standard error of the mean for n=3.

The measurement of the redox potential of soils is shown in FIG. 6.

Conclusion: FIG. 6 shows a greater decrease in the redox potential of the soil when the soils are treated with the different types of combination according to the invention.

The invention claimed is:

1. A composition intended for culture substrates and/or culture solutions consisting of the combination of:

(a) at least one clay, siliceous, or clay-siliceous mineral compound; and (b) at least one carbon compound comprising at least 5% by mass of total carbon and/or at least 1% by mass of organic carbon relative to the total mass of the carbon compound, said combination being obtained by heat treating, in the presence of water, the mixture of compounds (a) and (b), wherein the heat treatment consists of heating to a temperature between 30° C. and 95° C., wherein the water content of the combination is between 1% and 5% by mass relative to the total mass of the combination, and wherein the at least one carbon compound (b) is selected from the group consisting of saccharides, chars, biochars, hydrochars, lignosulfonates, and mixtures thereof.

2. The composition according to claim 1, wherein the at least one clay, siliceous, or clay-siliceous mineral compound (a) is selected from the group consisting of clay, diatomaceous earth, tangue, siliceous sand, and mixtures thereof.

3. The composition according to claim 2, wherein the at least one clay, siliceous, or clay-siliceous mineral compound (a) is clay.

4. The composition according to claim 1, wherein the at least one carbon compound (b) is selected from the group consisting of glucose, molasses, biochars, and mixtures thereof.

5. The composition according to claim 4, wherein the at least one carbon compound (b) is molasses, alone or mixed with a biochar.

6. The composition according to claim 1, wherein the compound (a)/compound (b) mass ratio is in the range between 70/30 and 5/95.

7. The composition according to claim 6, wherein the compound (a)/compound (b) mass ratio is in the range between 57/43 and 10/90.

8. The composition according to claim 1, wherein the heat treatment consists of heating to a temperature between 60° C. and 90° C.

9. A fertilizer or soil conditioner comprising the composition according to claim 1.

10. The fertilizer according to claim 9, which is a simple, binary or ternary solid fertilizer of the mineral fertilizer, organo-mineral fertilizer, organic fertilizer, or a water-soluble fertilizer type.

11. The soil conditioner according to claim 9, which is a mineral, organo-mineral, or organic soil conditioner.

12. The fertilizer or soil conditioner according to claim 9, further comprising natural or synthetic biostimulant compounds, growth regulators, carboxylic acids, seaweed extracts, humic substances, plant extracts, microbial extracts, minerals, or a combination thereof, and/or any excipient suitable for administration to a culture substrate and/or to a culture solution.

13. A method for modifying the redox potential and the pH of soils, for stimulating the enzymatic activities of the cycle of carbon, nitrogen, sulfur, and phosphorus, for improving the bioavailability of macro-(N, P, K, S, Mg and Ca) and micro-(Fe, Mn, Cu, Zn, Mo, Se) nutrients, for stimulating bacterial and fungal growth in soils, for promoting the transformation of nitrous oxide ($N_2O$) into dinitrogen ($N_2$), for stimulating the production of chlorophyll in plants and/or for increasing the nitrogen content of plants, comprising applying the fertilizer or soil conditioner according to claim 9.

14. A method for reducing the redox potential of an oxidized culture substrate and/or of an oxidized culture solution, or increasing the redox potential of a reduced culture substrate and/or of a reduced culture solution, and/or maintaining the redox potential of a culture substrate and/or a culture solution at a value between 450 mV and 350 mV, comprising applying the fertilizer or soil conditioner according to claim 9 to the surface of the culture substrates or as a mixture with the culture substrates and/or solutions.

15. A method for reducing the redox potential of an oxidized culture substrate and/or of an oxidized culture solution, or increasing the redox potential of a reduced culture substrate and/or of a reduced culture solution, and/or maintaining the redox potential of a culture substrate and/or a culture solution at a value between 450 mV and 350 mV, comprising applying the composition according to claim 1 to the surface of the culture substrates, or as a mixture with the culture substrates and/or solutions.

16. The method according to claim 15, comprising applying a concentration of 1 kilogram to 200 kilograms of the combination per hectare once or several times.

17. The method according to claim 15, comprising applying the combination before and/or during the growth of the cultivated plants.

18. A method of manufacturing the composition according to claim 1 comprising the following successive steps:

(i) mixing the compounds (a) and (b) in the presence of water, optionally followed by grinding the mixture;

(ii) heat treating the mixture obtained in step (i); and (iii) recovering the composition obtained in step (ii).

19. The method according to claim 18, wherein the water of step (i) is added by humidification in in an amount between 0.1 ml to 10 ml of water per gram of mixture.

20. The method according to claim 18, wherein step (ii) consists in heating the mixture to a temperature between 30° C. and 95° C.

* * * * *